US006869129B2

(12) United States Patent
Ohba et al.

(10) Patent No.: US 6,869,129 B2
(45) Date of Patent: Mar. 22, 2005

(54) RESIN BRACKET AND OPENING/SHUTTING MECHANISM USING THE SAME

(75) Inventors: Toshiya Ohba, Wako (JP); Hiromichi Mizuno, Aichi (JP); Ryuji Utsuno, Aichi (JP)

(73) Assignees: Aoyama Seisakusho Co., Ltd., Nagoya (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/243,782

(22) Filed: Sep. 13, 2002

(65) Prior Publication Data

US 2003/0052491 A1 Mar. 20, 2003

(30) Foreign Application Priority Data

Sep. 17, 2001 (JP) ...................................... 2001-281655

(51) Int. Cl.[7] .................................................. B60J 1/18

(52) U.S. Cl. ............................... 296/146.2; 296/146.16

(58) Field of Search ....................... 296/201, 56, 146.2, 296/146.3, 146.16

(56) References Cited

U.S. PATENT DOCUMENTS

| | | | | | |
|---|---|---|---|---|---|
| 3,947,006 | A | * | 3/1976 | Bauer et al. | 267/120 |
| 4,261,612 | A | * | 4/1981 | Chrysler et al. | 296/146.8 |
| 4,715,647 | A | * | 12/1987 | Mynott et al. | 296/152 |
| 5,676,484 | A | * | 10/1997 | Chamberlin et al. | 403/122 |
| 6,203,094 | B1 | * | 3/2001 | Lee | 296/106 |
| 6,250,148 | B1 | * | 6/2001 | Lynam | 73/170.17 |

FOREIGN PATENT DOCUMENTS

| | | | |
|---|---|---|---|
| GB | 1459056 | A | 12/1976 |
| GB | 2332475 | A | 6/1999 |

* cited by examiner

*Primary Examiner*—Jason Morrow

(74) *Attorney, Agent, or Firm*—Frishauf, Holtz, Goodman & Chick, P.C.

(57) ABSTRACT

A resin bracket comprising a mount portion mounted to a member being mounted and an extending portion extended from the mount portion, wherein a ball joint with a substantially spherical-shaped portion is provided integrally on the extending portion. An opening/shutting mechanism having two resin brackets, wherein each of brackets is mounted members being mounted to be opened and closed.

20 Claims, 20 Drawing Sheets

RESIN BRACKET AND OPENING/SHUTTING MECHANISM USING THE SAME

FIELD OF THE INVENTION

The present invention relates to a bracket mounted on a member being mounted, for example, a glass hatch mounted on a tailgate part of an automobile or the like, and an opening/shutting mechanism using the bracket.

BACKGROUND OF THE INVENTION

A glass hatch on a tailgate part of an automobile is used to be opened and closed by an opening/shutting mechanism comprising, for example, a bracket formed with a ball joint and mounted on a glass surface, another bracket formed with a ball joint and mounted in a predetermined location on the tailgate part, and an expandable and contractable damper connecting between these two ball joints. However, a conventional bracket is made of steel and mounted in an exposed state to be, which is heavy and presents a bad outward appearance. A conventional bracket is generally provided with two mount holes for mounting thereinto fasteners such as bolts or the like, and is clamped to a member being mounted, such as glass hatch or the like, by means of two fasteners. Therefore, parts are increased in number and much manhour is required in mounting to increase a production cost.

SUMMARY OF THE INVENTION

The present invention solves the above problems in the prior art provides a bracket, allowing simple mounting and having a good outward appearance and an opening/shutting mechanism making use of the bracket.

In order to solve the above problems, the present invention provides a resin bracket comprising a mount portion mounted to a member being mounted and an extending portion extended from the mount portion, wherein a ball joint having a substantially spherical-shaped portion is provided integrally on the extending portion.

The present invention also provides an opening/shutting mechanism having two resin brackets, wherein each of brackets mounted on each of two members being mounted, respectively, so as to be opened and closed, the mechanism comprising a urging member bridging across the resin brackets and for urging to the other member being mounted, in an opening/closing direction, wherein both ends of the urging member are rotatably held on ball joints provided on the resin brackets.

DESCRIPTION OF THE PREFERRED EMBODIMENTS

An explanation will be given below to a resin bracket embodying the present invention and embodiments of an opening/shutting mechanism making use of the resin bracket with reference to the drawings. In the preferred embodiments, an explanation will be given using a glass hatch of a tailgate part of an automobile as an example.

Figure 1:
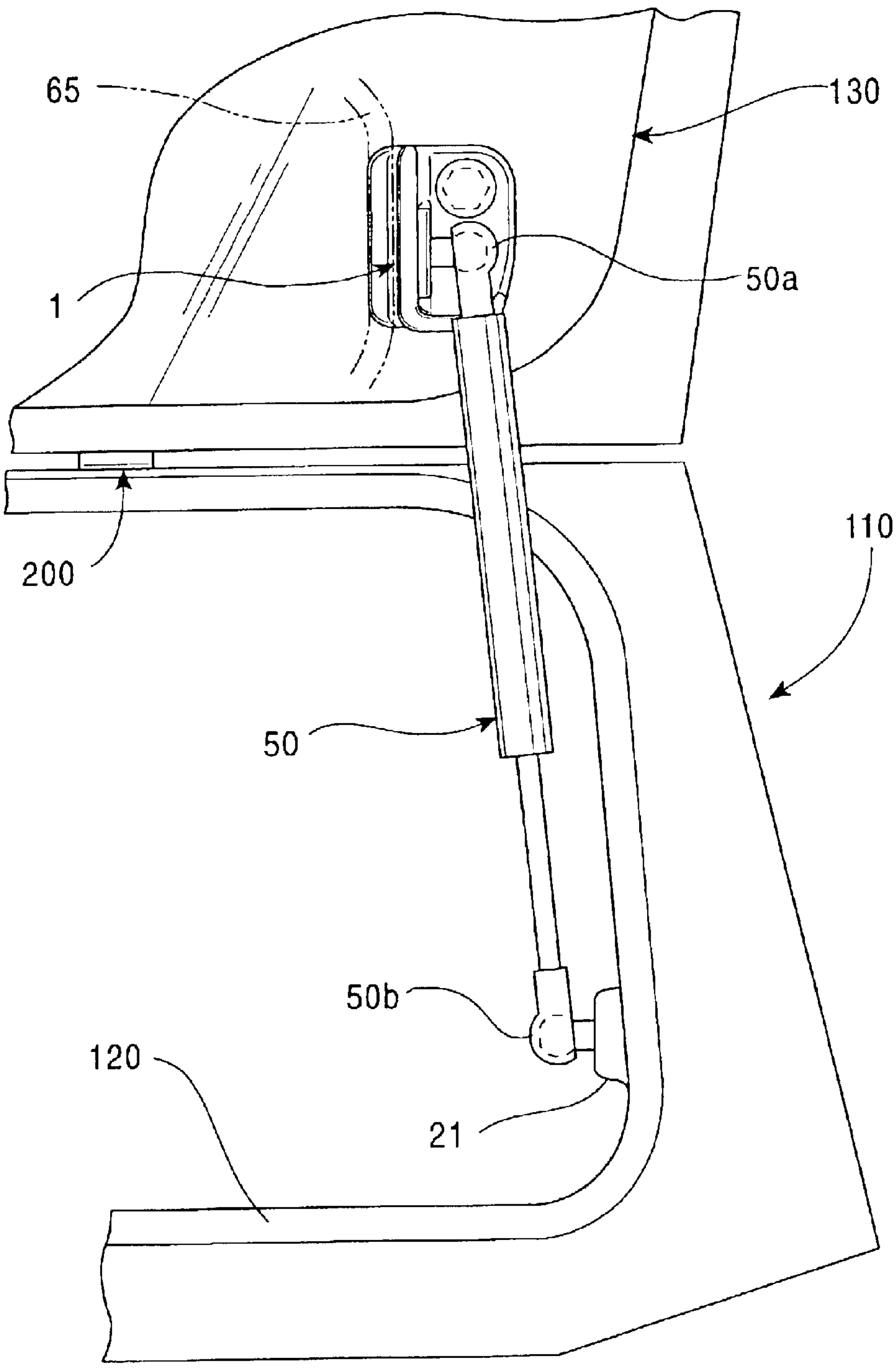
FIG. 1 is a fragmentary, enlarged view showing a tailgate part, on which an opening/shutting mechanism according to the present invention is mounted.

Here, FIG. 1 is a fragmentary, enlarged view showing a tailgate part of an automobile. As shown in FIG. 1, an opening 120 is formed on a rear part of a body of an automobile 110. A hinge 200 is fixed above the opening 120. A spring-up type glass hatch 130 is rotatably provided on the opening 120 by the hinge 200, and the glass hatch 130 can be opened and closed relative to the opening 120.

An end of a damper 50 is fixed on the glass hatch 130. The damper 50 can give urge to the glass hatch 130 with the use of air pressure or the like. The other end of the damper 50 is fixed on a peripheral edge of the opening 120 of the body 110. The damper 50 is provided to bridge across the glass hatch 130 and the body 110 through brackets 1 and 21 formed integrally from a synthetic resin material.

Figure 12:
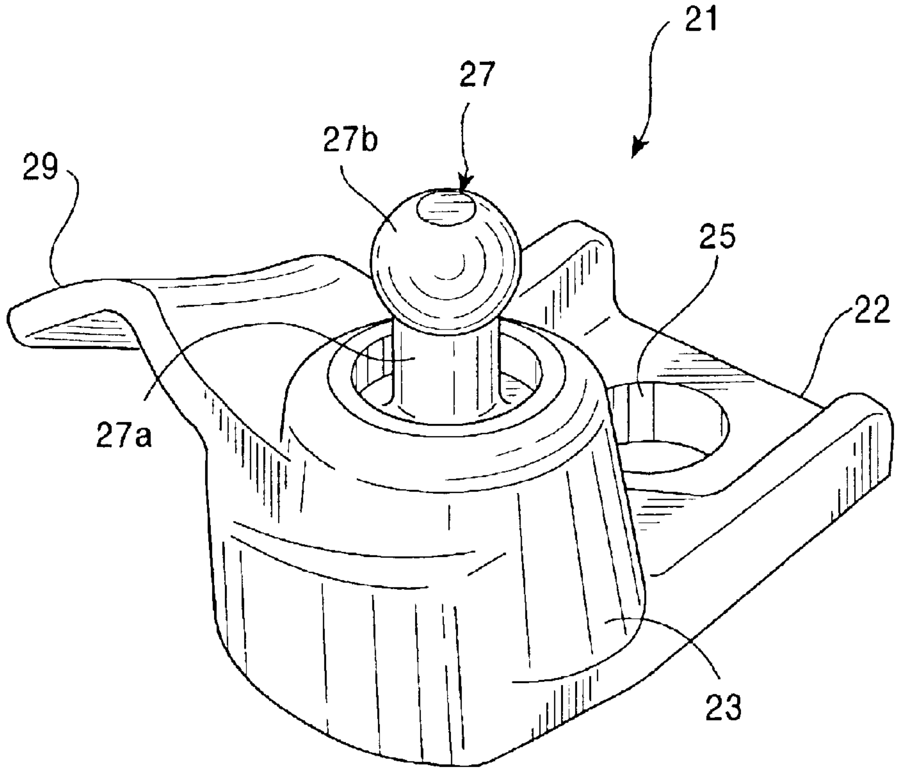
FIG. 12 is a perspective top view showing a bracket according to a second embodiment of the invention.
Figure 13:
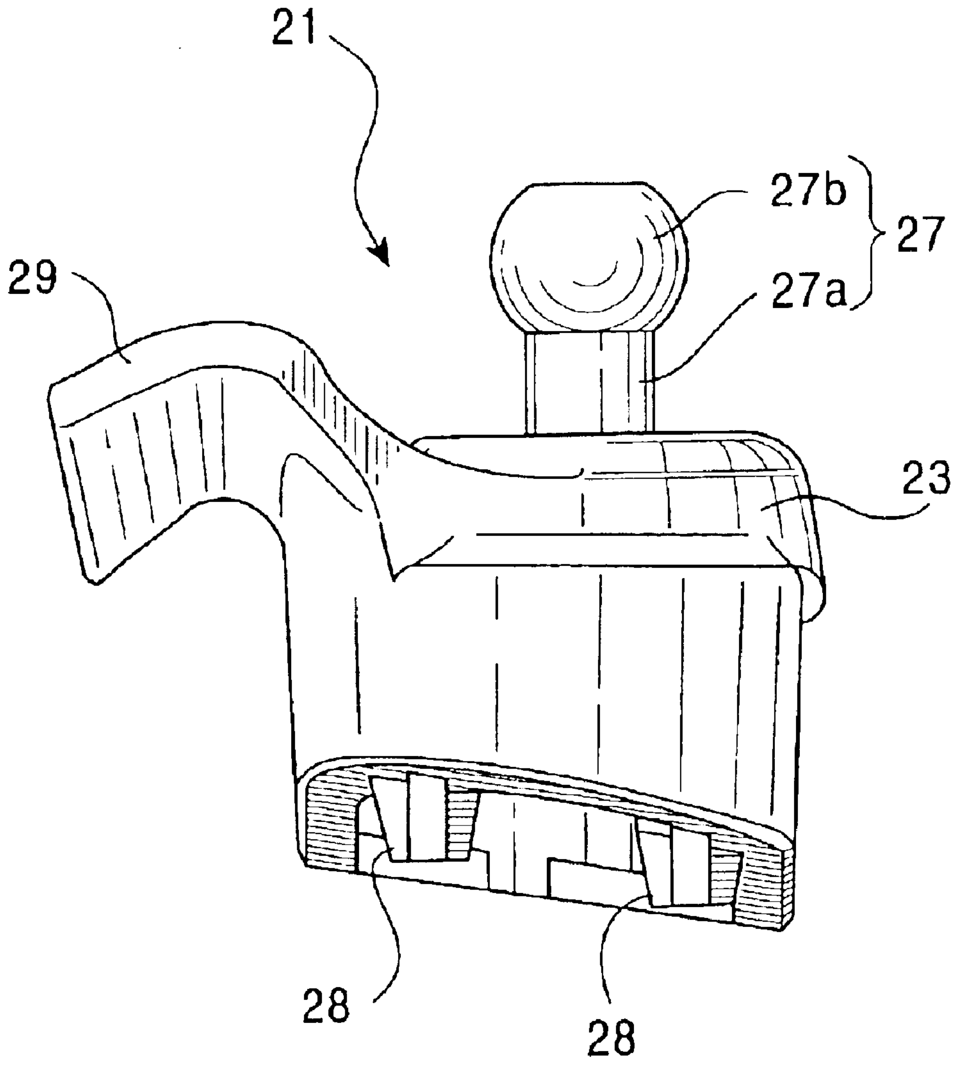
FIG. 13 is a front view showing the bracket shown in FIG. 12.
Figure 14:
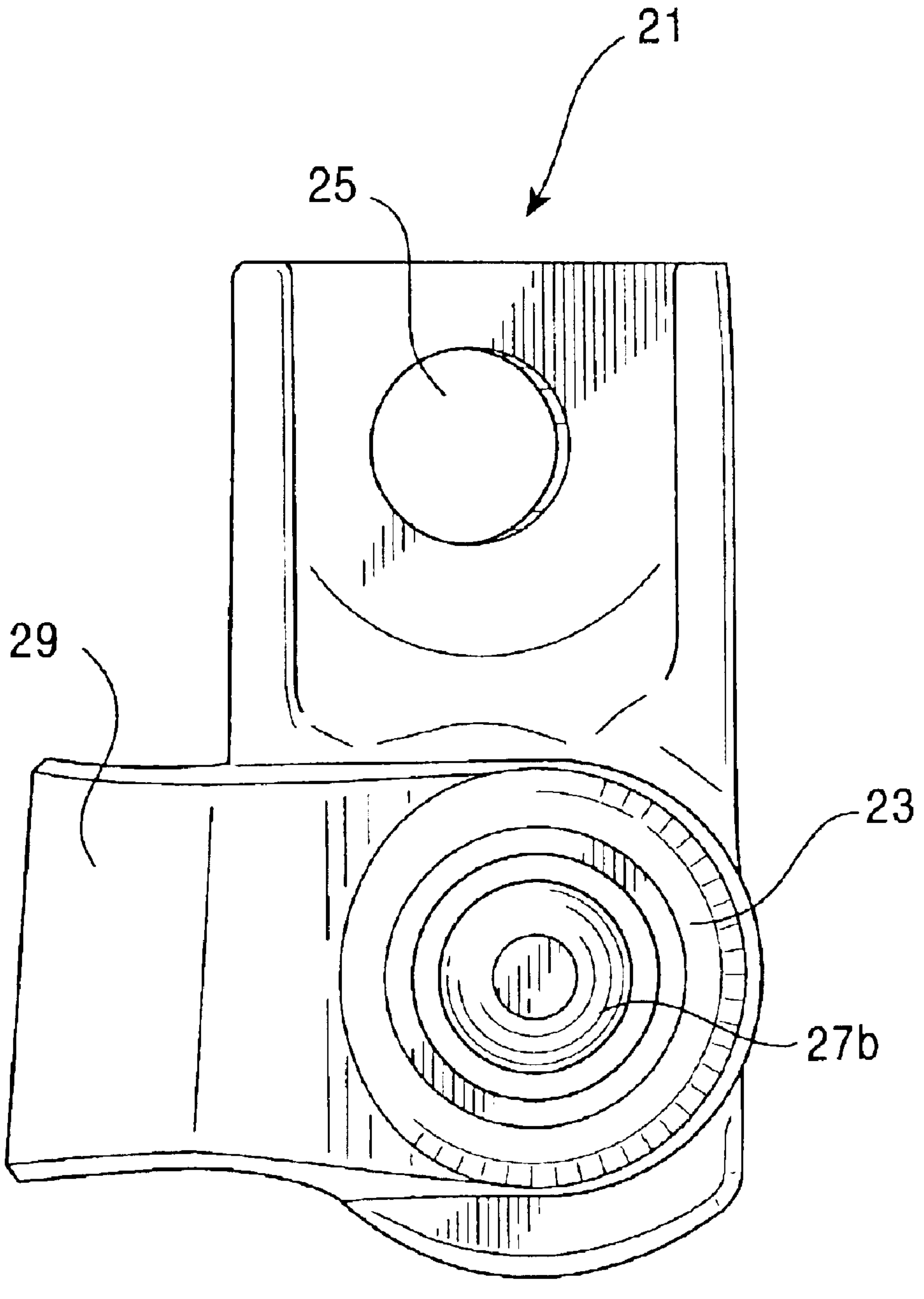
FIG. 14 is a plan view showing the bracket shown in FIG. 12.
Figure 15:
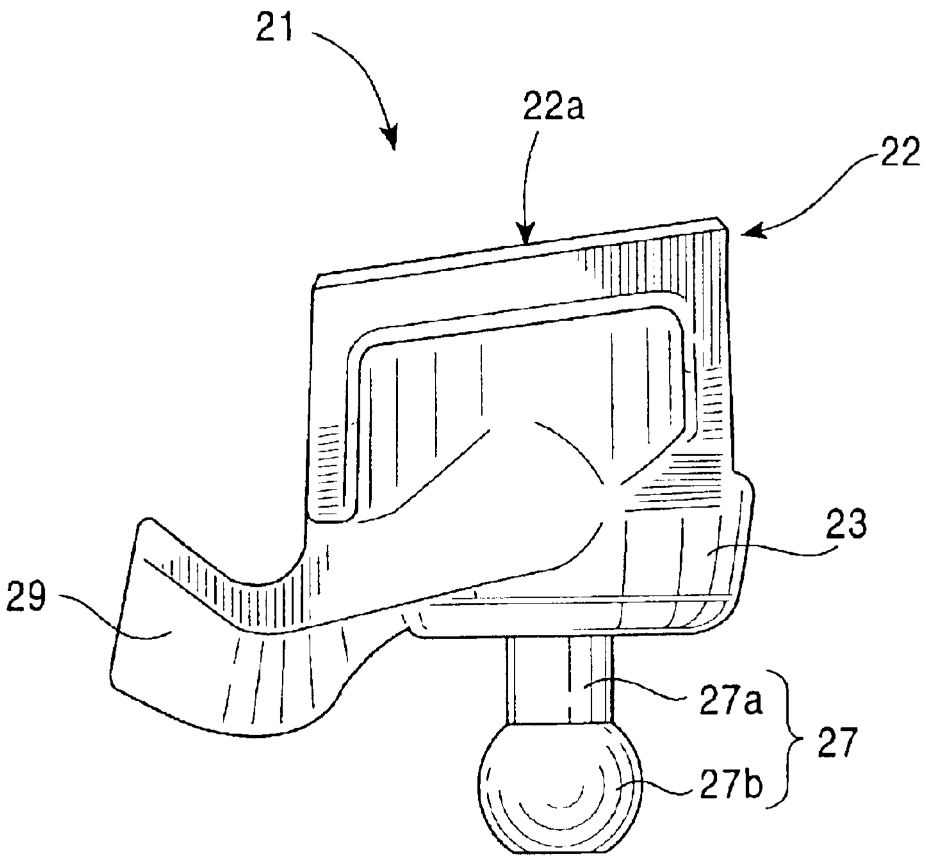
FIG. 15 is a back view showing the bracket shown in FIG. 12.
Figure 16:
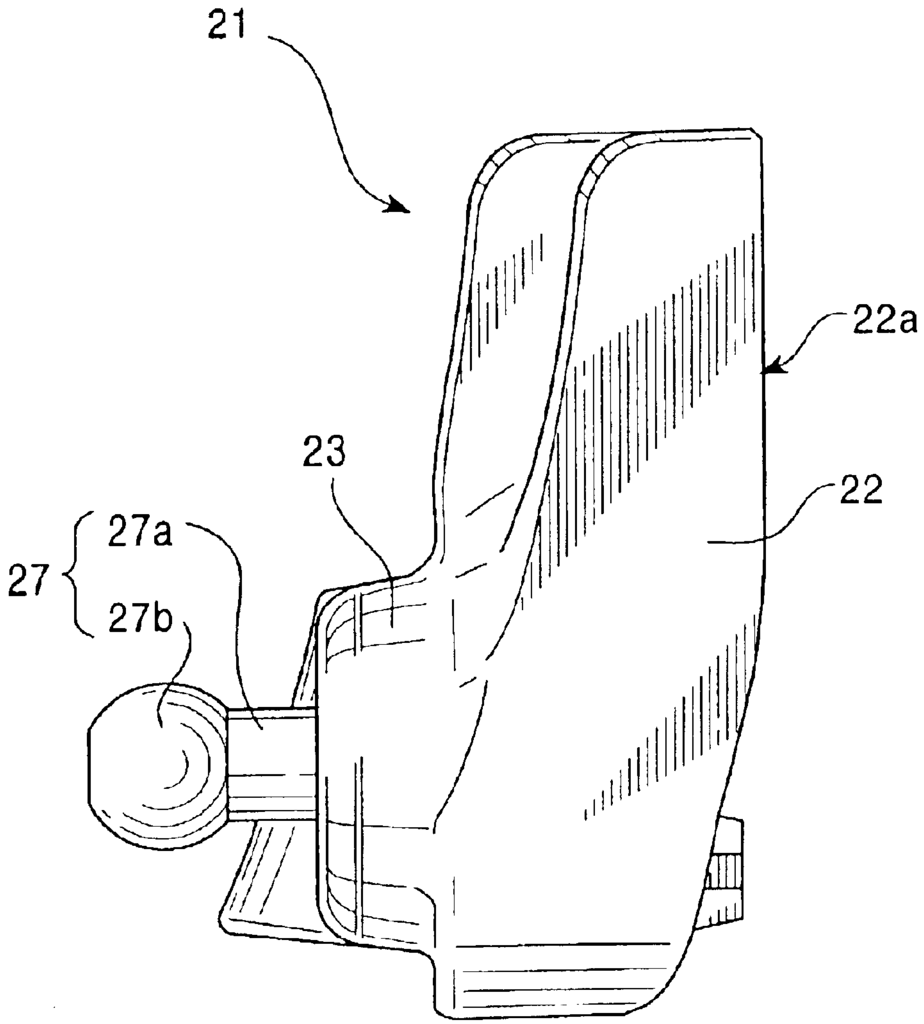
FIG. 16 is a left side view showing the bracket shown in FIG. 12.
Figure 17:
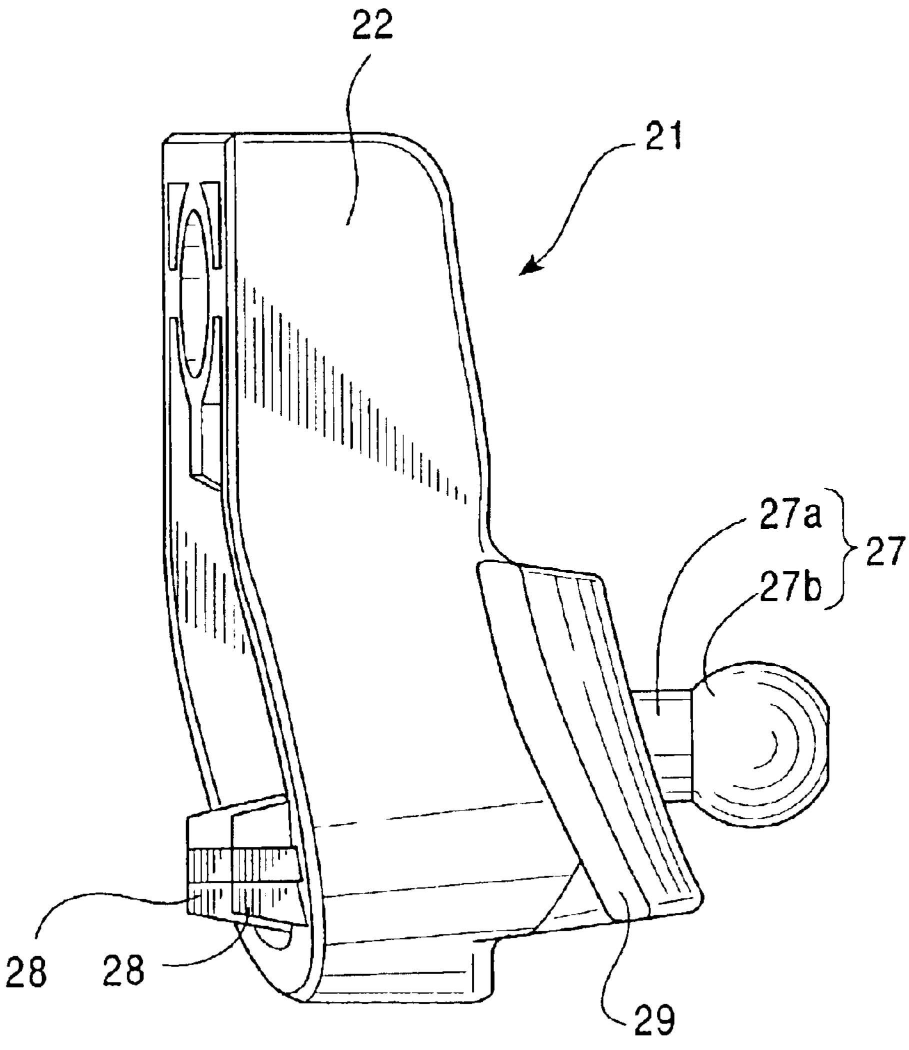
FIG. 17 is a right side view showing the bracket shown in FIG. 12.
Figure 18:
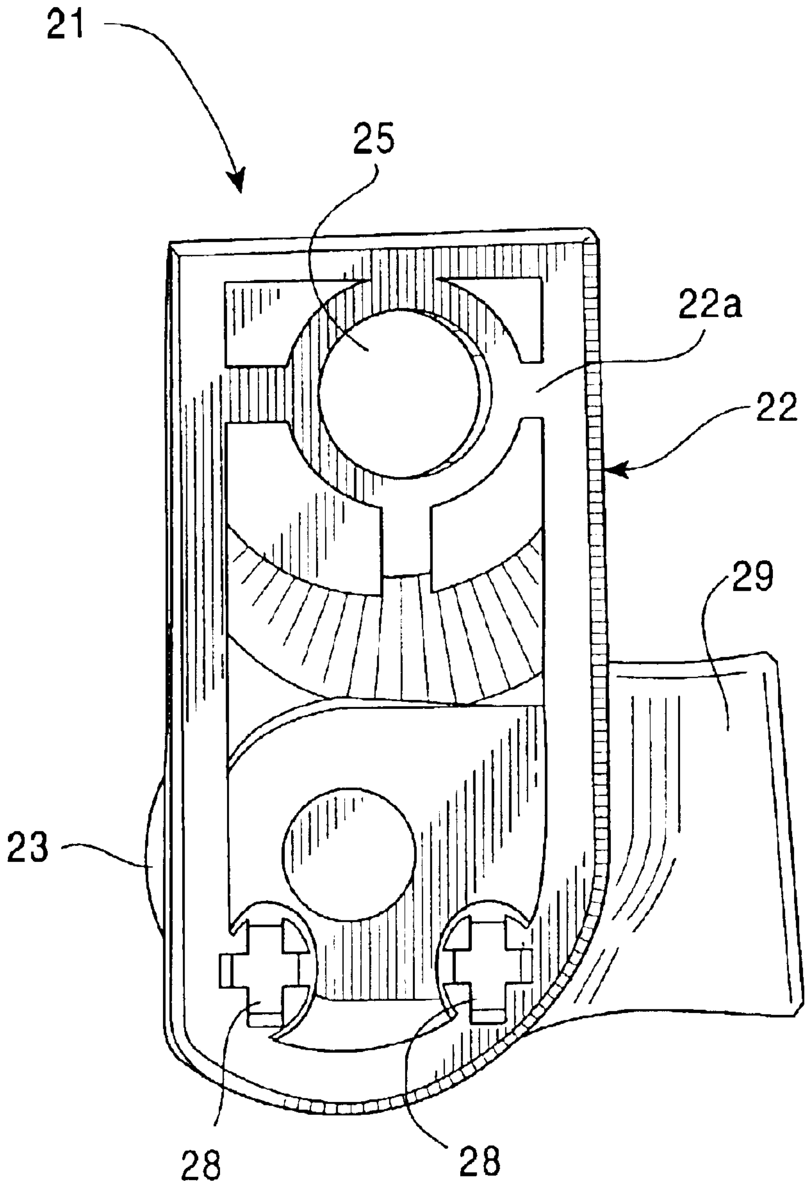
FIG. 18 is a bottom view showing the bracket shown in FIG. 12.

More specifically, the damper 50 is formed at both ends thereof with a pair of hollow and semi-spherical ball-joint holding portions 50*a* and 50*b*. The ball-joint holding portion 50*a* is fitted onto a spherical-shaped portion 7*b* (see FIG. 2) of a ball joint 7 provided integrally on the bracket 1 mounted on the glass hatch 130. The ball-joint holding portion 50*b* is fitted onto a spherical-shaped portion 27*b* (see FIG. 12) of a ball joint 27 provided integrally on the bracket 21 mounted on the body 110. The glass hatch 130 is sprung up rearwardly and upwardly of the body 110 from a state in which the opening 120 is covered by the glass hatch 130, by the bias of the damper 50, and then the glass hatch 130 is opened.

Figure 2:
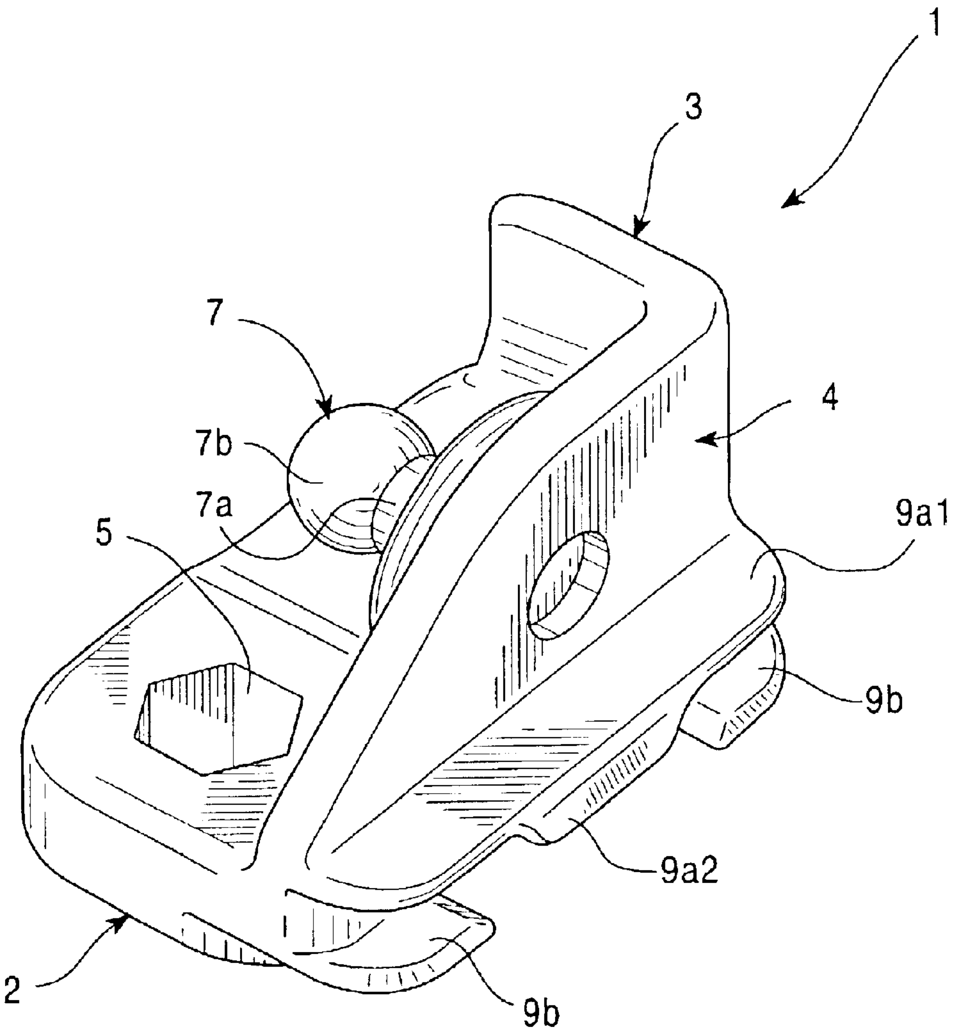
FIG. 2 is a perspective view showing a bracket according to a first embodiment, as viewed from a side thereof.

Subsequently, an explanation will be given to the resin bracket 1 fixed on the glass hatch 130 with reference to FIGS. 2 to 10. As shown in FIGS. 2 to 10, the bracket 1 has a substantially rectangular-shaped mount wall 2, having substantially rectangular-shaped upright wall 3, and a substantially rectangular-shaped ball-joint supporting wall 4. The mount wall 2 having a predetermined thickness is mounted on the glass hatch 130 (see FIG. 1). The upright wall 3 having a predetermined thickness is provided upright from a back side edge of the mount wall 2 as shown in FIG. 2. The ball-joint supporting wall 4 having a predetermined thickness is provided upright from a right side edge of the mount wall 2. The upright wall 3 and the ball-joint supporting wall 4 are provided upright on the mount wall 2 so as to be contiguous to each other in a substantially vertical state. The ball joint 7 is projected from a substantially central position of a side 4*a* of the ball-joint supporting wall 4 (see FIG. 3) so as to be disposed above the mount wall 2. The ball joint 7 is made of a metallic material, and composed of a substantially columnar-shaped base 7*a* (see FIGS. 3 and 4) and a spherical-shaped portion 7*b* formed on a tip end of the base. The ball joint 7 is substantially perpendicular to the ball-joint supporting wall 4 and is integrated with the ball-joint supporting wall 4 by means of insert molding.

Figure 3:
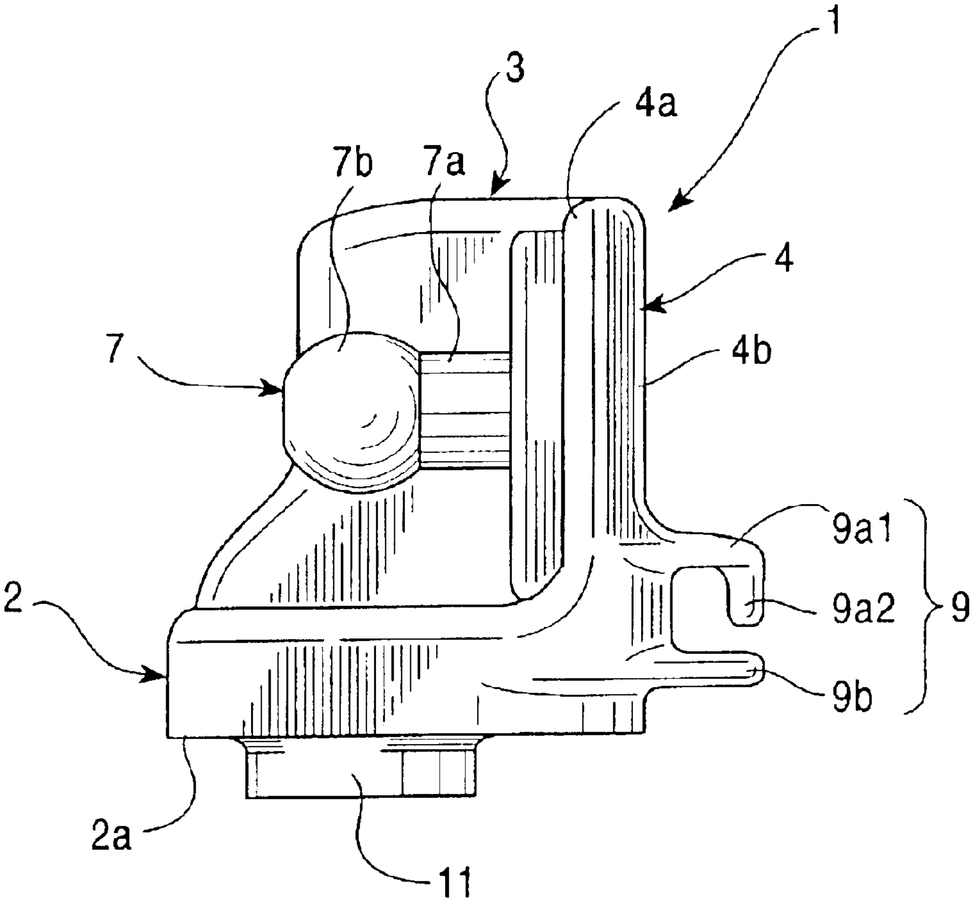
FIG. 3 is a front view showing the bracket shown in FIG. 2.
Figure 4:
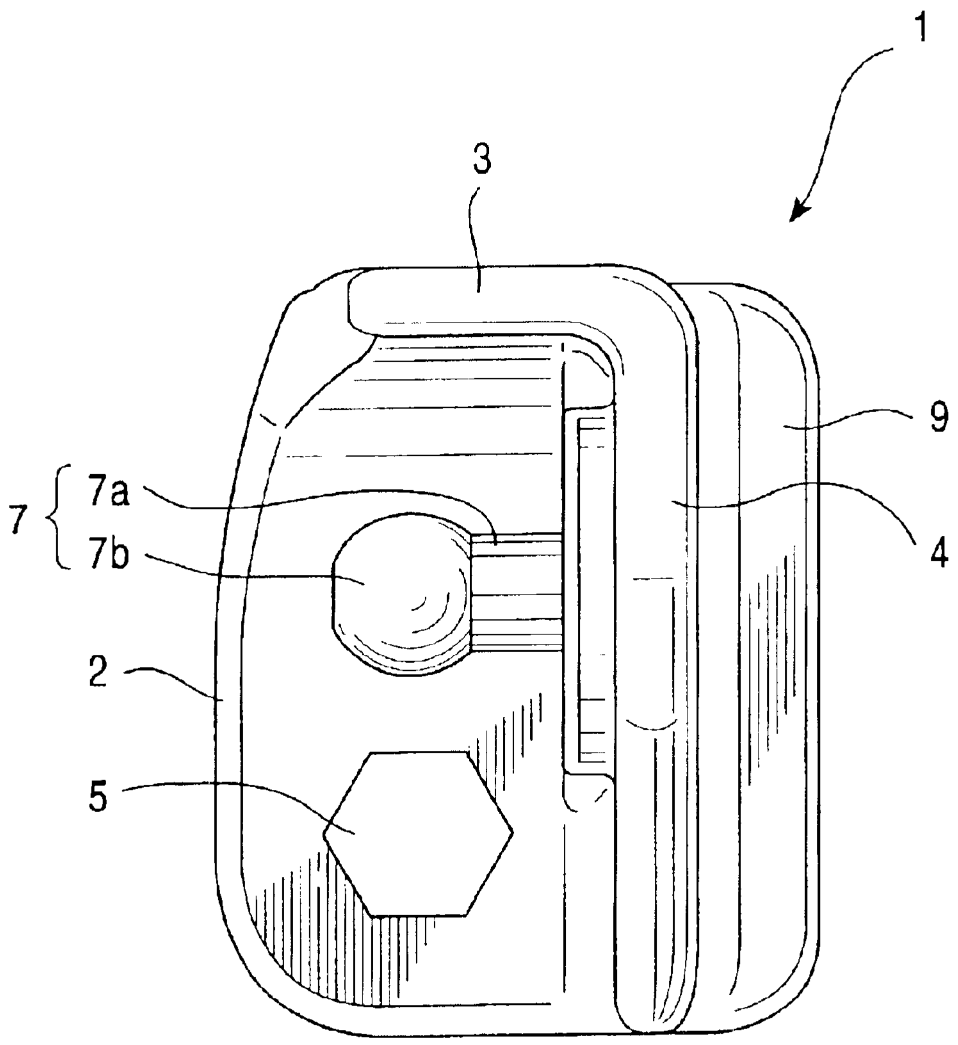
FIG. 4 is a plan view showing the bracket shown in FIG. 2.
Figure 5:
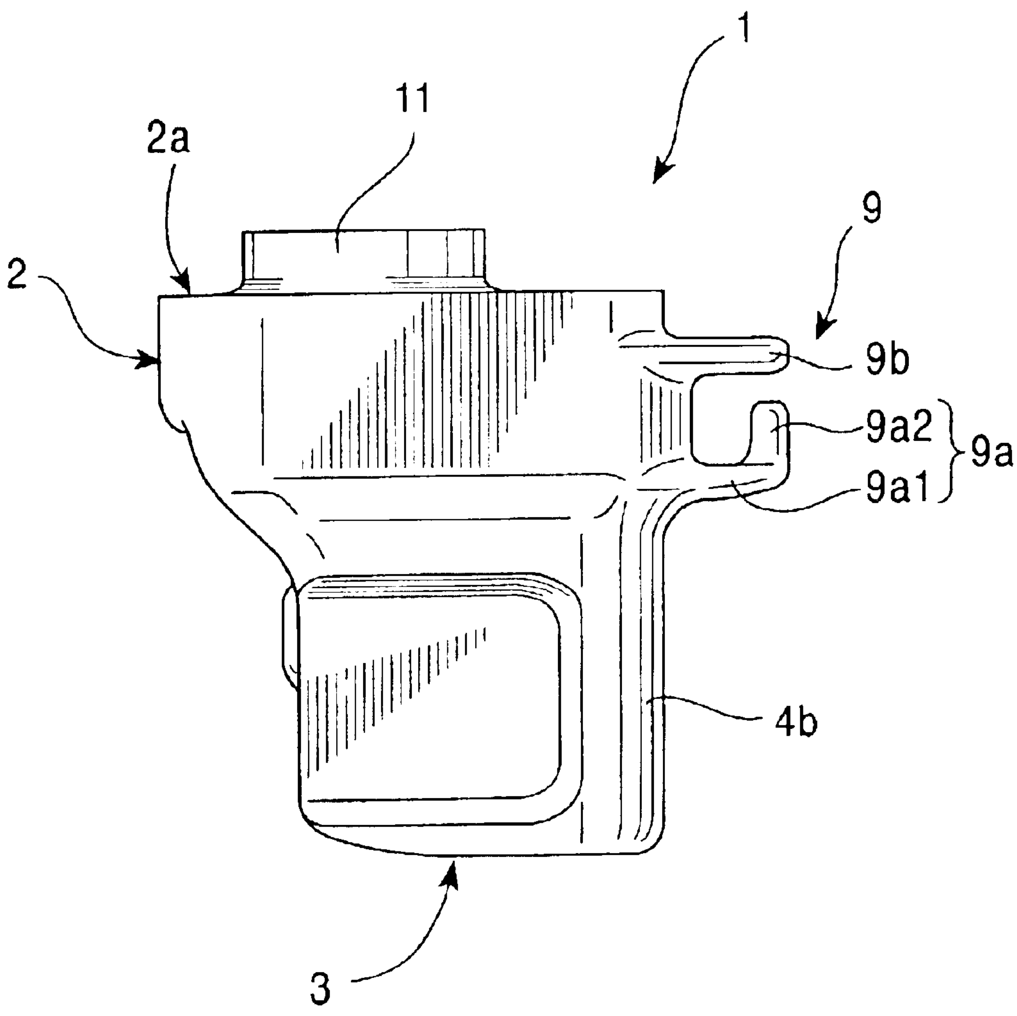
FIG. 5 is a back view showing the bracket shown in FIG. 2.
Figure 6:
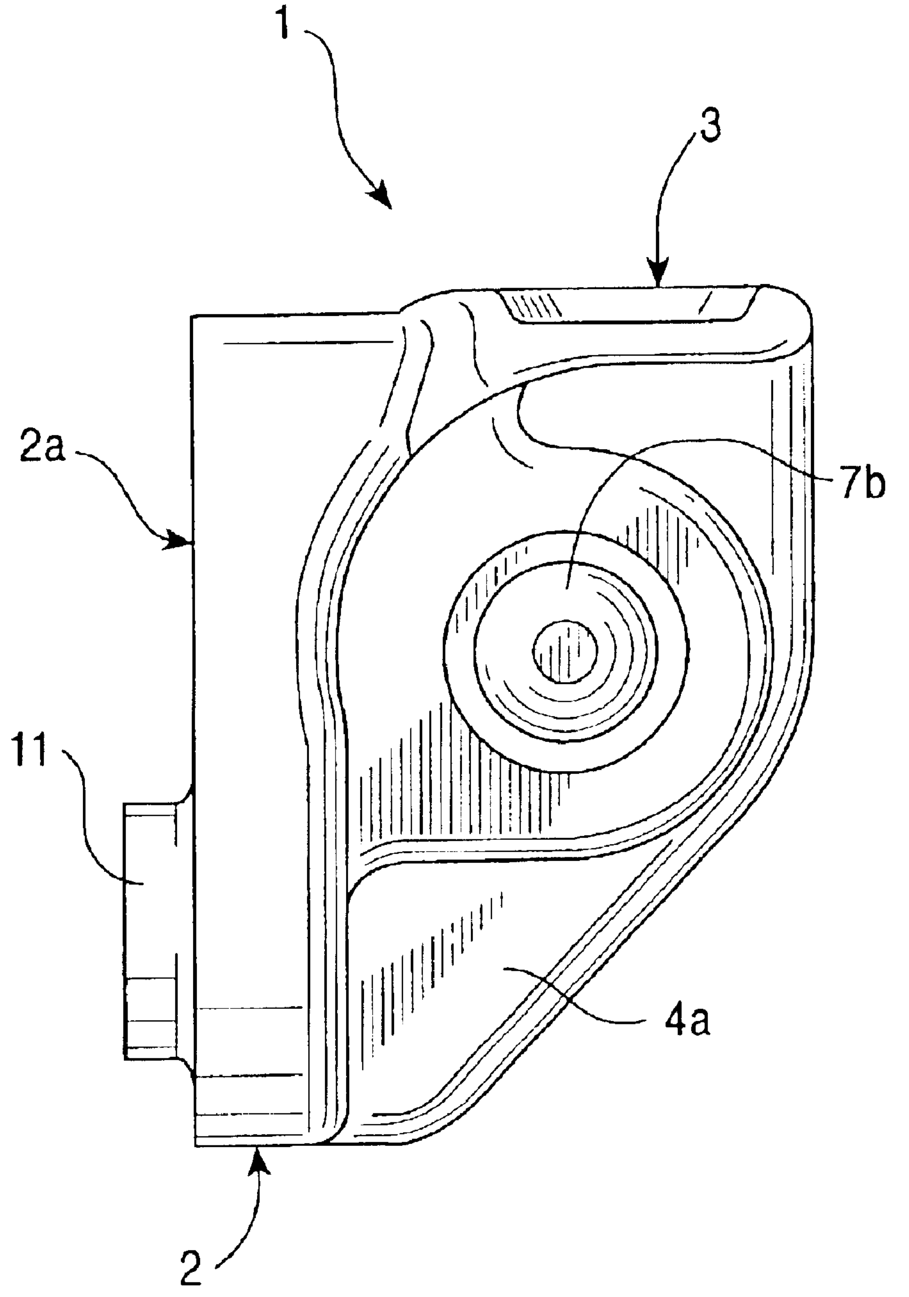
FIG. 6 is a left side view showing the bracket shown in FIG. 2.
Figure 7:
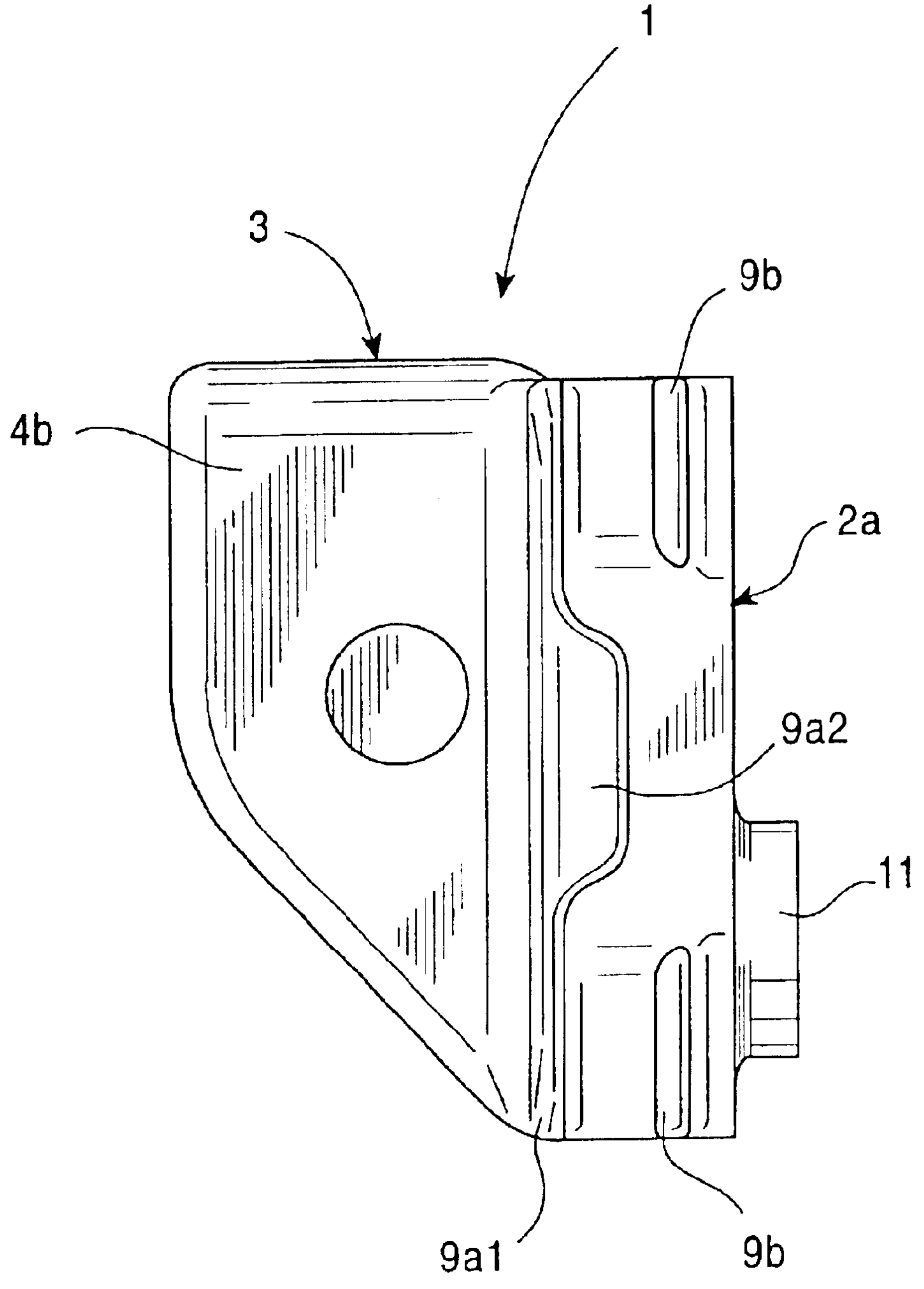
FIG. 7 is a right side view showing the bracket shown in FIG. 2.
Figure 8:
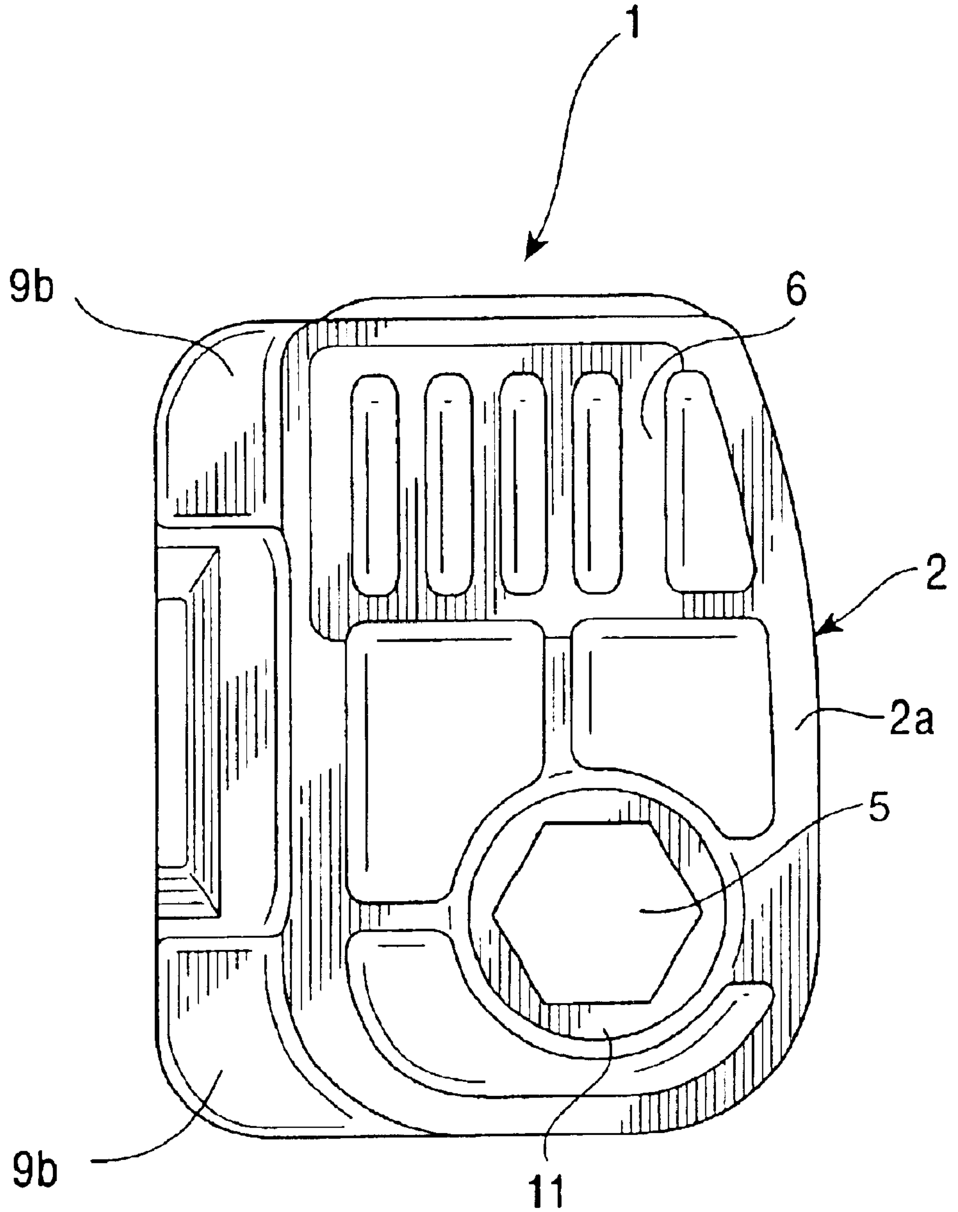
FIG. 8 is a bottom view showing the bracket shown in FIG. 2.
Figure 9:
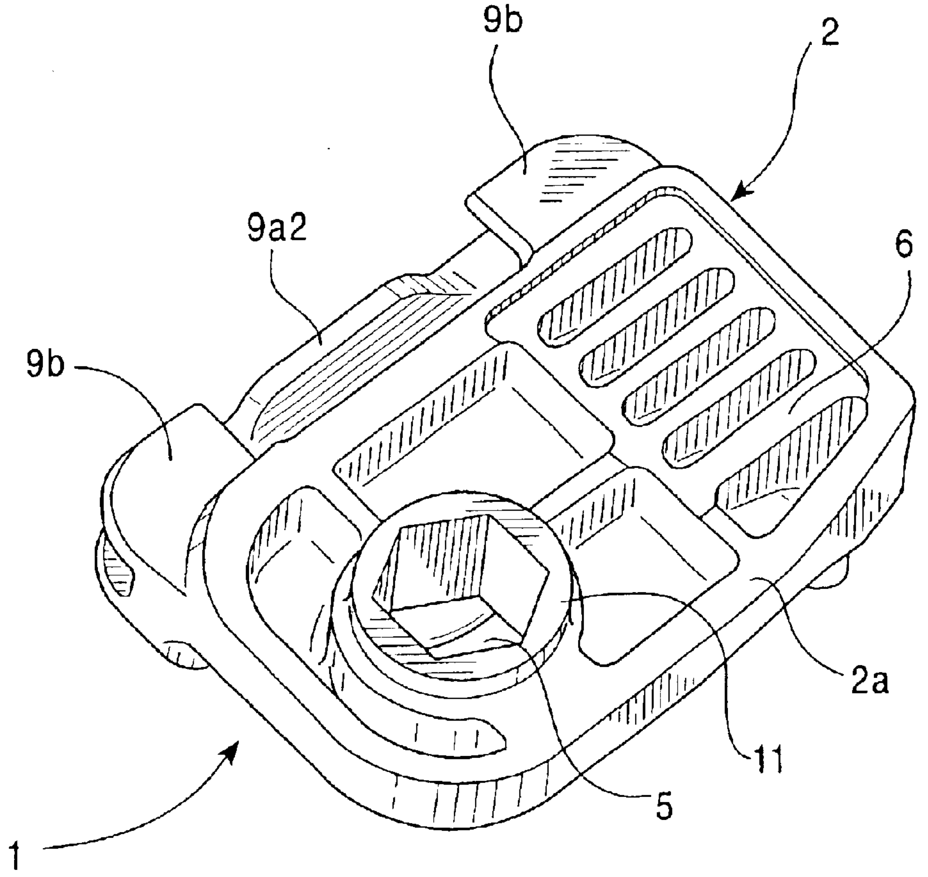
FIG. 9 is a perspective bottom view showing the bracket shown in FIG. 2.
Figure 10:
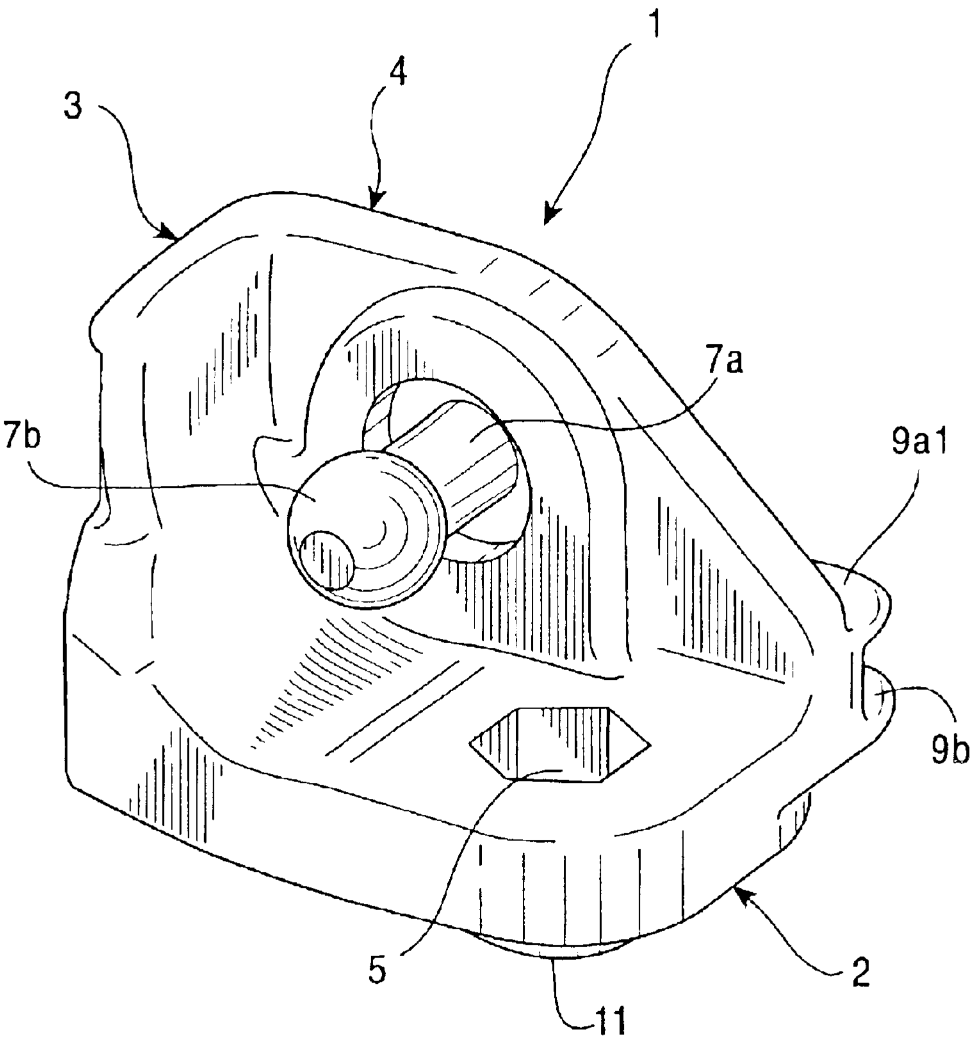
FIG. 10 is a perspective top view showing the bracket shown in FIG. 2.

A through hole 5 shaped to be substantially hexagonal in plan view is formed in a front side of FIG. 2 and positioned substantially centrally in a right and left direction on the mount wall 2 in a manner not to overlap the ball joint 7 in plan view. As shown in FIGS. 3 and 9, the through hole 5 extends through the mount wall 2 to lead to a cylinder 11, which is substantially columnar in external form to protrude a predetermined length from a back surface 2*a* of the mount wall 2. A bonding portion 6 being bonded to the glass hatch 130 shown in FIG. 1 is formed in the location where the cylinder 11 is not provided on the back surface 2*a* of the mount wall 2. The bonding portion 6 is rib-shaped to comprise abutment surfaces, against which an adhesive (not shown) such as an adhesive tape or the like abuts, and non-abutment surfaces formed by cutting the abutment surfaces in a groove manner, thus ensuring strength for the bracket itself and achieving lightening thereof.

Further, as shown in FIGS. 2 to 10, a guide portion 9 is provided along an outside edge of an intersecting portion between the mount wall 2 and the ball-joint supporting wall 4. The guide portion 9 serves to guide a conductive wire 65 (see FIG. 1) extended from a heating coil (not shown) provided in the glass hatch 130 shown in FIG. 1. The guide portion 9 is composed of an upper member 9*a* shaped such that a substantially L-shaped cross section is extended over the above side edge, and a lower member 9*b* formed partly below and opposite to the upper member 9*a*.

More specifically, the upper member 9*a* has a horizontal portion 9*a*1 and a vertical portion 9*a*2. The horizontal portion 9*a*1 is plate-shaped to protrude from a side 4*b* of the ball-joint supporting wall 4 opposite to the mount wall 2 and extend substantially parallel to the mount wall 2 in an opposite direction to a direction, in which the mount wall 2 extends. The vertical portion 9*a*2 is plate-shaped to suspend downward in FIG. 3 from a tip end edge of the horizontal portion 9*a*1 centrally of the length of the horizontal portion.

The lower member 9*b* having a plate-shape with a predetermined thickness forms a predetermined gap below the horizontal portion 9*a*1 and protrudes discontinuously from locations, which correspond to portions where the vertical portion 9*a*2 does not suspend, in the same direction as that, in which the horizontal portion 9*a*1 protrudes. That is, the upper member 9*a* and the lower member 9*b* define a space having a substantially square cross section in a longitudinal direction, in which the space is received the conductive wire 65 extended from a high mount lamp.

Figure 11:
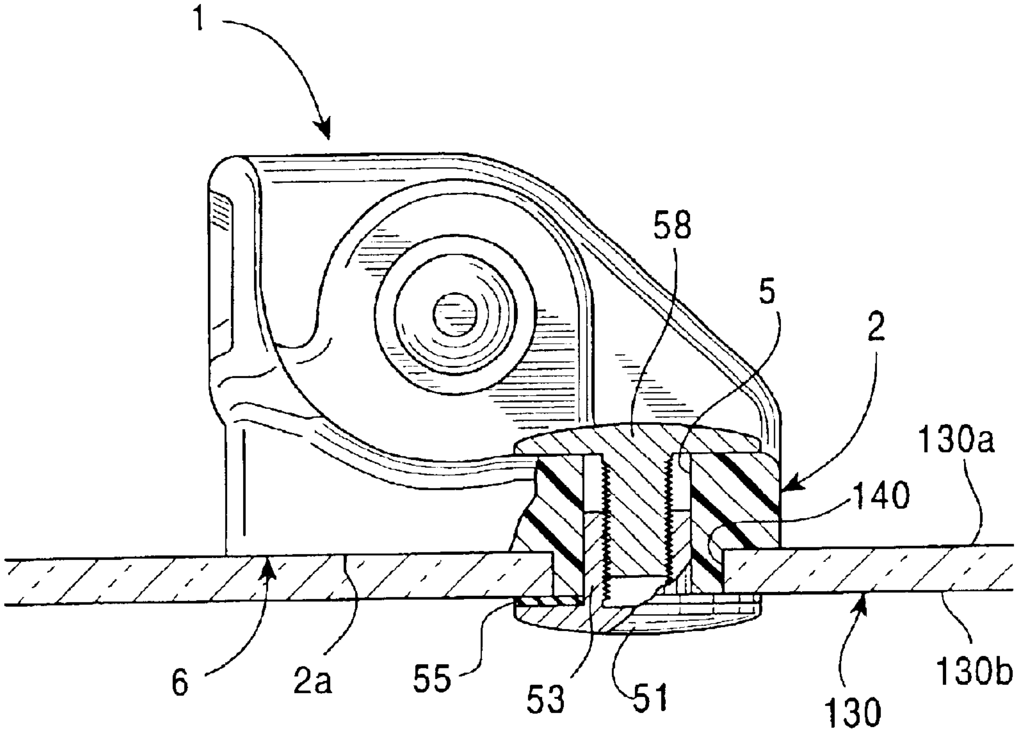
FIG. 11 is a side view showing a state, in which a bracket 1 is mounted on a glass hatch.

As shown in FIG. 11, when the bracket 1 is to be mounted on the glass hatch 130, the back surface 2*a* of the mount wall 2 and a bracket mount surface 130*a* of the glass hatch 130 are first opposed each other. Then, the cylinder 11 protruding from the back surface 2*a* of the mount wall 2 is fitted into a through hole 140 formed on the glass hatch 130, and an adhesive tape (not shown) is inserted between the glass hatch 130 and the bonding portion 6. A nut 53 having a hexagonal shape in external form and molded integrally with a lid member 51 of resin having a disk shape is then inserted from an outside surface 130*b* of the glass hatch 130 with a torus-shaped rubber ring 55 therebetween.

At this time, since the rubber ring 55 and the lid member 51 are shaped to have an outer diameter larger than that of the cylinder 11, the rubber ring 55 and the lid member 51 are abutted against and engaged with a peripheral edge of the through hole of the glass hatch 130. Further, a bolt 58 is screwed into the nut 53 from an opposite side of the mount wall 2, and then the bracket 1 can be mounted on the glass hatch 130 while the nut 53 is latched by the through hole 5 formed in the mount wall 2.

Subsequently, an explanation will be given to the resin bracket 21 fixed on the body 110 with reference to FIGS. 12 to 19. As shown in FIGS. 12 to 19, the bracket 21 has a mount wall 22 and a ball-joint supporting wall 23. The mount wall 22 having a predetermined thickness is substantially rectangular-shaped to be mounted on the body 110 (see FIG. 1). The ball-joint supporting wall 23 with substantially truncated in shape and protrudes upwardly from a substantially half region of the mount wall 22 in a front side of FIG. 12. Extended leftwardly from a base end of the ball-joint supporting wall 23 and shown on a left side in the figure is an ornamental piece 29. The ornamental piece 29 having a predetermined thickness is substantially arc-shaped and convex in side view and substantially rectangular in plan view.

A metallic ball joint 27 is also provided on an upper end of the ball-joint supporting wall 23. The ball joint 27 has substantially the same shape as that of the ball joint 7 provided integrally on the bracket 1. The ball joint 27 is composed of a substantially columnar-shaped base 27*a*, and a spherical-shaped portion 27*b* formed on a tip end of the base. The ball joint 27 is integrated with the ball-joint supporting wall 23 by means of insert molding in a state, in which an axis of the ball joint 27 overlaps an axis of the ball-joint supporting wall 23. A through hole 25 shaped to be substantially circular in plan view is also formed on a back side of the mount wall 22 in FIG. 12 and is positioned in substantially center of a right and left direction of the mount wall.

Figure 19:
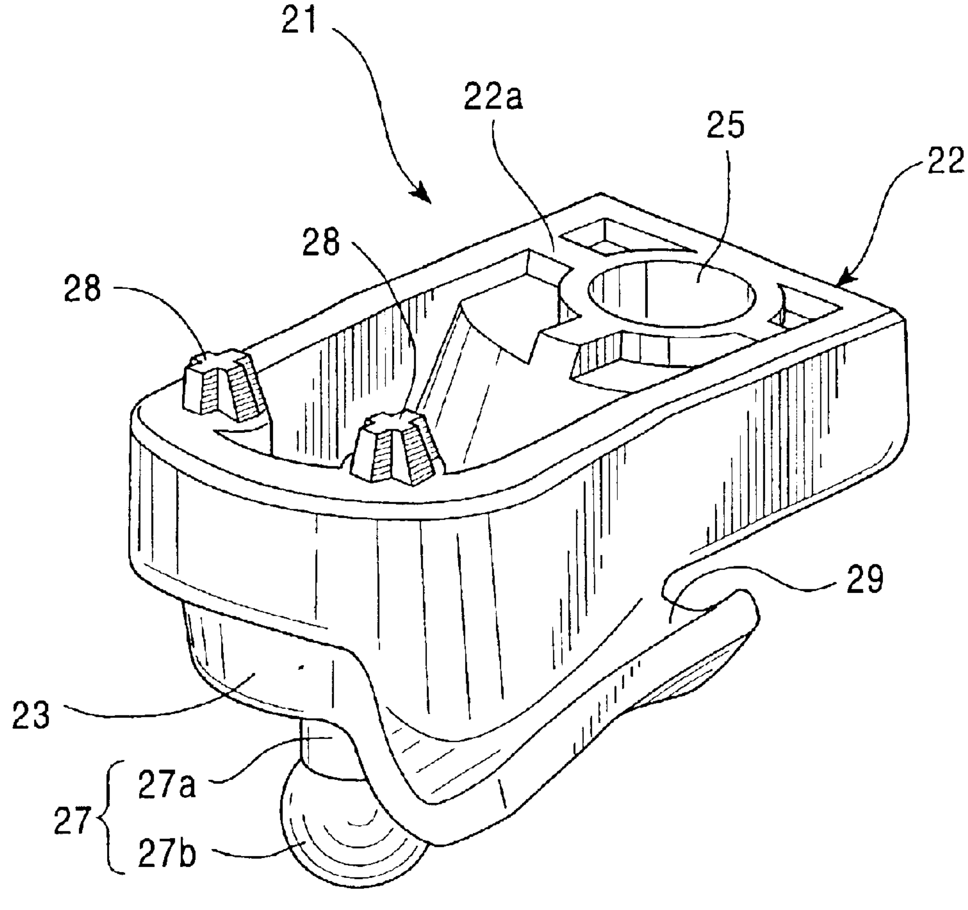
FIG. 19 is a perspective bottom view showing the bracket shown in FIG. 12.
Figure 20:
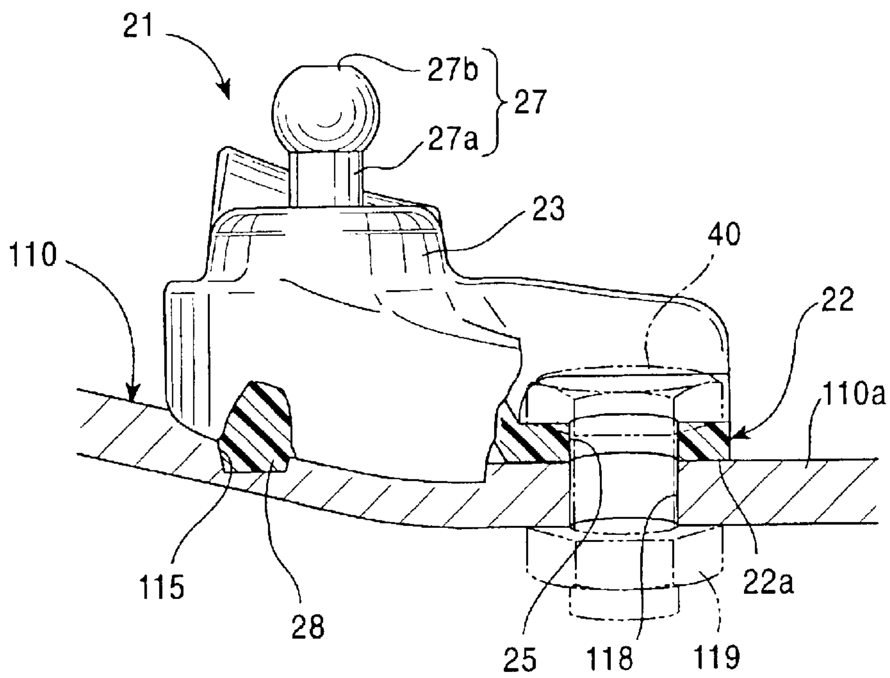
FIG. 20 is a side view showing a state, in which the bracket shown in FIG. 12 is mounted on a body.

As shown in FIG. 19, a pair of projections 28 are provided in the location where the through hole 25 is not provided on a back surface 22*a* of the mount wall 22. The projections 28 are fitted into recesses 115 described later and provided on the body 110. More specifically, the projections 28 are provided on the back surface 22*a* of the mount wall 22 to be disposed in the vicinity of a side line on an opposite side to a side, on which the through hole 25 is formed, and in pair in a right and left direction in the figure. As shown in FIG. 20, when the bracket 21 is to be mounted on the body 110, the back surface 22*a* of the mount wall 22 and a bracket mount surface 110*a* of the body 110 are opposed each other. Each of the projections 28, protruding from the back surface 22*a* of the mount wall 22 are then fitted into the recesses 115 provided on the body 110. Further, the through hole 25 formed on the mount wall 22 is positioned to a through hole 118 formed on the body 110. A bolt 40 is then inserted into the through hole 25 from a side of the bracket mount surface 110*a* of the body 110.

A nut 119 coaxial with the through hole 118 is fixed on an opposite side of the body 110 to the bracket mount surface 110*a*. The nut 119 is screwed after insertion of the bolt 40 into the through hole 25, and then the bracket 21 can be mounted on the body 110 to be latched. The ornamental piece 29 extended from the ball-joint supporting wall 23 of the bracket 21 is contiguous to the bracket mount surface 110*a* of the body 110, though the state is not shown, so that the outward appearance from outside can be improved.

As described above, the brackets 1 and 21 are mounted on the glass hatch 130 and the body 110, respectively. Then, as shown in FIG. 1, the ball-joint holding portion 50*b* at one end of the damper 50 is fitted onto the spherical-shaped portion 27*b* of the ball joint 27 of the bracket 21 (see FIG. 12) and the ball-joint holding portion 50*a* at the other end opposite to the one end of the damper 50 is fitted onto the spherical-shaped portion 7*b* of the ball joint 7 of the bracket 1 (see FIG. 2). In this manner, the opening/shutting mechanism for a tailgate part of an automobile is constituted.

With the opening/shutting mechanism, the damper 50 bridging across the both brackets 1 and 21 performs extending, contracting and turning motions to ensure the glass hatch 130 to open and close relative to the body 110. More specifically, when the glass hatch 130 is sprung up in an opening direction, that is, rearwardly and upwardly of the body 110 from a state in which the glass hatch 130 is closed, the bracket 21 fixed on the body 110 serves as a stationary part while the damper 50 elongates and turns a predetermined angle rearwardly and upwardly about the bracket 21, whereby urging force is applied to the glass hatch 130 through the bracket 1 to open the glass hatch 130.

As described in detail, the bracket 1 in the present invention is molded integrally from a synthetic resin material and so is lightweight and easy to handle, as compared with a metallic one.

Since the guide portion 9 guiding the conductive wire 65 extended from a heating coil provided in the glass hatch 130 is provided along the outside edge of the intersecting portion between the mount wall 2 and the ball-joint supporting wall 4, it is possible to prevent the conductive wire 65 from being flexed, twisted, or the like and to receive the conductive wire with attractiveness while opening and closing motions of the opening/shutting mechanism on a tailgate part is not hindered.

Since the ornamental piece 29 extended from the ball-joint supporting wall 23 of the bracket 21 is contiguous to the bracket mount surface 110*a* of the body 110 when the bracket 21 in the embodiment is mounted, the outward appearance from outside can be improved.

In addition, the present invention is not limited to the above embodiments but affords various modifications. For example, while the brackets are molded from a resin material and the ball joints are formed from a metallic material, all the brackets and the ball joints may be molded from a resin material. The structure of mount parts of the brackets for a member being mounted is not limited to the embodiments but may be any one provided that latching of the nuts for mounting and latching of the brackets themselves can be effected. Further, the opening/shutting mechanism in the embodiments may be applicable to not only a tailgate part of an automobile but also an opening/shutting mechanism provided with a spring-up type door or doors, or other opening/shutting mechanisms.

What is claimed is:

1. A resin bracket comprising:

a mount portion mounted on a member;

an extending portion extended from the mount portion; and a ball joint having a substantially spherical-shaped portion provided integrally on the extending portion;

wherein the mount portion comprises a through hole for inserting a fastening part to fasten the mount portion to the member, and a latch portion for preventing rotation relative to the member.

2. The resin bracket according to claim 1, wherein the latch portion comprises at least one projection which is fitted into at least one recess on the member.

3. The resin bracket according to claim 1, wherein the latch portion comprises a sheet-shaped member having two opposite adhesive surfaces, and one of said adhesive surfaces contacts the member.

4. The resin bracket according to claim 1, further comprising a guide portion which guides a wire-shaped member.

5. An opening/shutting mechanism comprising two resin brackets wherein each said bracket is mounted on one of two members such that the members are adapted to be opened and closed, and wherein each said resin bracket comprises (i) a mount portion mounted on one of said members; (ii) an extending portion extended from the mount portion; and (iii) a ball joint having a substantially spherical-shaped portion provided integrally on the extending portion, the mechanism comprising:

an urging member which bridges between the resin brackets and which urges each of the two members in one of an opening direction and a closing direction, wherein each end of the urging member is rotatably held on one said ball joint of one of the resin brackets.

6. The opening/shutting mechanism according to claim 5, wherein the two members comprise an automobile body and a door member mounted on the automobile body.

7. The resin bracket according to claim 2, wherein the latch portion comprises a sheet-shaped member having two opposite adhesive surfaces, and one of said adhesive surfaces contacts the member.

8. The resin bracket according to claim 2, further comprising a guide portion which guides a wire-shaped member.

9. The resin bracket according to claim 3, further comprising a guide portion which guides a wire-shaped member.

10. An opening/shutting mechanism having two said resin brackets according to claim 1, wherein each said resin bracket is mounted on one of two said members such that the two said members are adapted to be opened and closed, the mechanism comprising:

an urging member which bridges between the resin brackets and which urges each of the two members in one of an opening direction and a closing direction, wherein each end of the urging member is rotatably held on one said ball joint of one of the resin brackets.

11. An opening/shutting mechanism having two said resin brackets according to claim 2, wherein each said resin bracket is mounted on one of two said members such that the two said members are adapted to be opened and closed, the mechanism comprising:

an urging member which bridges between the resin brackets and which urges each of the two members in one of an opening direction and a closing direction, wherein each end of the urging member is rotatably held on one said ball joint of one of the resin brackets.

12. An opening/shutting mechanism having two said resin brackets according to claim 3, wherein each said resin bracket is mounted on one of two said members such that the two said members are adapted to be opened and closed, the mechanism comprising:

an urging member which bridges between the resin brackets and which urges each of the two members in one of an opening direction and a closing direction, wherein each end of the urging member is rotatably held on one said ball joint of one of the resin brackets.

13. An opening/shutting mechanism having two said resin brackets according to claim 4, wherein each of said resin bracket is mounted on one of two said members such that the two said members are adapted to be opened and closed, the mechanism comprising:

an urging member which bridges between the resin brackets which urges each of the two members in one of an opening direction and a closing direction, wherein each end of the urging member is rotatably held on one said ball joint of one of the resin brackets.

14. The opening/shutting mechanism according to claim 10, wherein the two members comprise an automobile body and a door member mounted on the automobile body.

15. The opening/shutting mechanism according to claim 11, wherein the two members comprise an automobile body and a door member mounted on the automobile body.

16. The opening/shutting mechanism according to claim 12, wherein the two members comprise an automobile body and a door member mounted on the automobile body.

17. The opening/shutting mechanism according to claim 13, wherein the two members comprise an automobile body and a door member mounted on the automobile body.

18. The resin bracket according to claim 4, wherein the wire-shaped member comprises a conductive wire.

19. The resin bracket according to claim 8, wherein the wire-shaped member comprises a conductive wire.

20. The resin bracket according to claim 9, wherein the wire-shaped member comprises a conductive wire.

* * * * *